United States Patent
Daniels et al.

(10) Patent No.: US 10,436,235 B2
(45) Date of Patent: Oct. 8, 2019

(54) LOCKING ADJUSTABLE LENGTH ROD ASSEMBLY

(71) Applicant: LIBERTY HARDWARE MFG. CORP., Winston-Salem, NC (US)

(72) Inventors: James Leroy Daniels, Stokesdale, NC (US); Stephen Bertrand, Stoney Point, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 569 days.

(21) Appl. No.: 14/575,369

(22) Filed: Dec. 18, 2014

(65) Prior Publication Data

US 2016/0177991 A1 Jun. 23, 2016

(51) Int. Cl.
*F16B 7/14* (2006.01)
*A47H 1/022* (2006.01)
*B25G 1/04* (2006.01)

(52) U.S. Cl.
CPC .......... *F16B 7/1427* (2013.01); *A47H 1/022* (2013.01); *B25G 1/04* (2013.01); *Y10T 403/32501* (2015.01); *Y10T 403/7009* (2015.01); *Y10T 403/7011* (2015.01)

(58) Field of Classification Search
CPC ...... F16B 7/1418; F16B 7/1427; F16B 7/149; Y10T 403/32501; Y10T 403/7009; Y10T 403/7011; F16M 2200/027; B25G 1/04; A47H 1/022; A45B 2009/007
See application file for complete search history.

(56) References Cited

U.S. PATENT DOCUMENTS

| 527,273 | A | | 10/1894 | Fowler et al. |
|---|---|---|---|---|
| 3,073,632 | A | * | 1/1963 | Grunbaum ............. B65H 54/54 242/571.7 |
| 3,596,946 | A | * | 8/1971 | Burton ................ B05C 17/0205 15/144.4 |
| 4,076,437 | A | * | 2/1978 | Mazzolla .............. F16B 7/1427 248/411 |
| 4,419,026 | A | | 12/1983 | Leto |
| 4,632,437 | A | * | 12/1986 | Robson ................ F16L 37/101 285/243 |

(Continued)

FOREIGN PATENT DOCUMENTS

DE 29620818 U1 * 1/1997 ............ F16B 7/1427

*Primary Examiner* — Matthew R McMahon
(74) *Attorney, Agent, or Firm* — Brooks Kushman P.C.; Lora Graentzdoerffer

(57) ABSTRACT

An adjustable rod assembly includes an elongate first tubular member having a first end and a second end. A cam body is secured to the first end of the first tubular member and has an oblong shaft portion. A collar is disposed about the cam body with an inner surface shaped to coincide with the oblong shaft portion. An elastomeric sleeve is disposed about the collar. An elongate second tubular member has a first end sized to receive the first end of the first tubular member within an internal cavity and engages the elastomeric sleeve. Rotation of the collar to a locked position causes a force from the elastomeric sleeve against an internal surface of the second tubular member to resist axial translation. At least one of the first tubular member second end and a second tubular member second end is adapted to engage a household surface.

19 Claims, 5 Drawing Sheets

(56) References Cited

U.S. PATENT DOCUMENTS

| | | | | |
|---|---|---|---|---|
| 4,632,597 | A | * | 12/1986 | Clausen ............... F16B 7/1427 248/412 |
| 4,659,125 | A | * | 4/1987 | Chuan .................. A63B 47/02 16/429 |
| 4,782,845 | A | * | 11/1988 | Chou .................... A45B 9/00 135/75 |
| 5,011,408 | A | * | 4/1991 | Nakanishi ............. A61C 1/141 433/127 |
| 5,460,458 | A | * | 10/1995 | Caceres ................. B25G 1/04 16/429 |
| 5,487,529 | A | * | 1/1996 | Newville ............. A46B 11/063 239/281 |
| 5,692,856 | A | * | 12/1997 | Newman, Jr. ........... B25G 1/04 403/109.5 |
| 5,694,695 | A | * | 12/1997 | Lund ...................... B25G 1/04 15/144.4 |
| 6,550,728 | B1 | * | 4/2003 | Fuhrman ................ A47B 9/02 108/146 |
| 6,571,426 | B2 | | 6/2003 | Chen |
| 7,694,387 | B1 | * | 4/2010 | Huang ................... B25G 1/04 16/113.1 |
| 8,043,020 | B2 | | 10/2011 | Peng |
| 8,162,270 | B2 | * | 4/2012 | Lee ...................... F16B 7/1427 248/157 |
| 8,505,129 | B2 | | 8/2013 | Parker et al. |
| 8,505,749 | B2 | | 8/2013 | Trettin et al. |
| 8,533,912 | B2 | | 9/2013 | Tran |
| 8,544,661 | B1 | | 10/2013 | Melino, Sr. et al. |
| 8,696,229 | B2 | | 4/2014 | Tran |
| 8,851,784 | B2 | * | 10/2014 | Donohue ................ B25G 1/04 403/109.1 |
| 2007/0145202 | A1 | * | 6/2007 | Hsieh .................. F16B 7/1427 248/161 |
| 2009/0274511 | A1 | | 11/2009 | Chen |
| 2012/0005823 | A1 | | 1/2012 | Baines |
| 2012/0284914 | A1 | | 11/2012 | Bauer |
| 2012/0285914 | A1 | | 11/2012 | Carney |
| 2013/0022300 | A1 | * | 1/2013 | Fukumoto ............. F16M 11/24 384/154 |
| 2013/0092203 | A1 | | 4/2013 | Zaltron |
| 2013/0112639 | A1 | | 5/2013 | Baines |
| 2013/0198948 | A1 | | 8/2013 | Zeng |
| 2013/0198949 | A1 | | 8/2013 | Hai |
| 2013/0322956 | A1 | | 12/2013 | Montalto et al. |
| 2013/0322957 | A1 | | 12/2013 | Conrad |
| 2013/0334156 | A1 | | 12/2013 | Baines |
| 2016/0077412 | A1 | * | 3/2016 | Nakatani ................ F16B 7/149 403/377 |

\* cited by examiner

LOCKING ADJUSTABLE LENGTH ROD ASSEMBLY

TECHNICAL FIELD

The present disclosure relates to a tubular rod having a selectively adjustable length for accommodating household articles.

BACKGROUND

Elongate mounting members may be mounted or positioned in different locations as desired by a user. Such devices are suitable to accommodate various household articles. However, the corresponding environments can require mounting members to conform to a wide range of both dimensions and orientations. A convenient way to adjust a length of a mounting member may ease the burden imposed upon a user when mounting in different environments.

SUMMARY

In at least one embodiment, an adjustable rod assembly includes an elongate first tubular member defining a primary axis, the first tubular member having a first end and a second end. A cam body is secured to the first end of the first tubular member and has an oblong shaft portion. The rod assembly also includes a collar disposed about the cam body with an inner surface shaped to coincide with the oblong shaft portion. An elastomeric sleeve is disposed about the collar. The rod assembly further includes an elongate second tubular member having a first end sized to receive the first end of the first tubular member within an internal cavity and engage the elastomeric sleeve. A rotation of the collar to a locked position relative to the cam body causes an outward radial force from the elastomeric sleeve against an internal surface of the second tubular member to resist axial translation of the second tubular member relative to the first tubular member. The second tubular member also includes a second end, wherein at least one of the first tubular member second end and the second tubular member second end is adapted to engage a household surface.

In at least one embodiment, an adjustable rod assembly includes a first tubular member defining a primary axis, and a cam body secured to a first end of the first tubular member. The cam body defines an outer surface having opposing lobes that vary in distance from the primary axis as a function of angular position about the axis. The rod assembly also includes a second tubular member having a first end sized to slide over the first tubular member and the cam body. A collar is disposed about the lobes of the outer surface of the cam body, and a rotation of the cam body about the primary axis relative to the collar causes the opposing lobes to generate an outward force against an inner surface of the second tubular member. A second opposing end of at least one of the first tubular member and the second tubular member engages a household surface.

In at least one embodiment, an adjustable rod assembly includes an elongate first tubular member, and an elongate second tubular member adapted to longitudinally translate over the first tubular member to adjust an overall length of the telescoping rod. A cam body is affixed to an end of the first tubular member, and the cam body includes a shaft portion defining an oblong surface. The rod assembly also includes a collar defining an inner surface shaped to coincide with the oblong surface in an unlocked position. The collar also defines an outer surface defining a cylindrical shape. An elastomeric sleeve having a closed section is disposed about the collar. The collar is adapted to deform in response to rotation about the oblong surface. The collar further generates an outward radial force upon an inner surface of the second tubular member. The outward force operates to restrict longitudinal translation of the second tubular member relative to the first tubular member thereby fixing the overall length of the rod assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
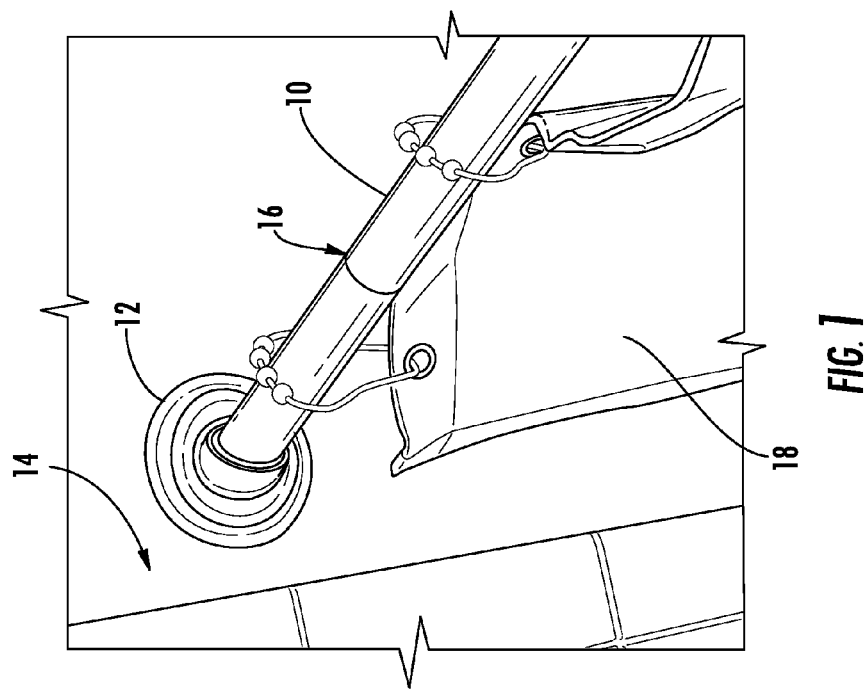
FIG. 1 is a cutaway elevation view of an adjustable length shower curtain rod.

Several household applications, such as kitchen and bathroom hardware, may benefit from the telescoping rod of the present disclosure. A number of particular uses require a horizontal positioning of an adjustable tubular member. For example, FIG. 1 depicts a cutaway view of an adjustable length shower rod 10. The shower rod 10 includes a first end portion 12 that interfaces with a vertical wall 14 of a shower opening. A second end portion (not shown) interfaces with an opposing vertical wall of the shower opening. The rod includes an adjustable portion 16 that allows the length of the rod 10 to be customized in length to conform to a range of shower opening dimensions. Once the rod 10 is conformed to a particular shower opening size, a correspondingly sized shower curtain 18 may be hung from the rod 10. In additional embodiments, a window curtain rod may similarly be customized in length to fit a range of different window opening sizes. Aspects of the present disclosure provide a user-friendly, convenient length adjustment to various tubular members.

Figure 2:
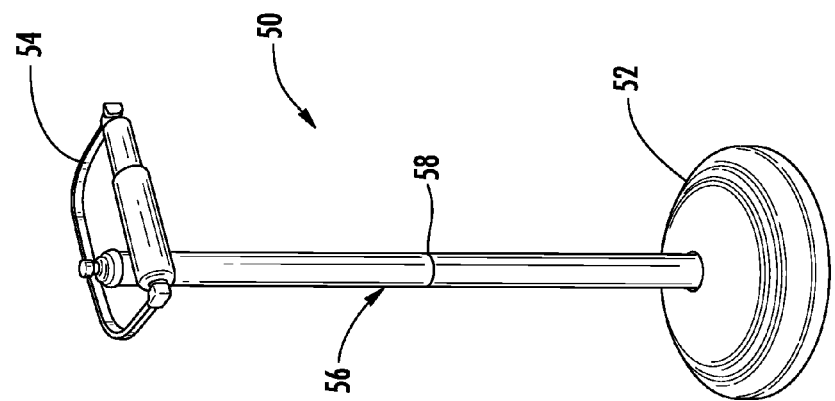
FIG. 2 is an elevation view of an adjustable height pedestal toilet paper holder.

Referring to FIG. 2, certain household hardware applications require vertical adjustment. By way of example, a pedestal toilet paper holder 50 is depicted having an adjustable height. The toilet paper holder 50 includes a base 52 that is weighted and configured to rest on a horizontal surface such as a floor. The toilet paper holder 50 also includes an upper dispensing portion 54 to retain a roll of toilet paper. Depending on the user placement, it may be desirable to adjust the height of the dispensing portion 54.

The toilet paper holder 50 includes a telescoping tubular portion 56 between the base 52 and dispensing portion 54. Specifically, a locking mechanism 58 may be selectively engaged to fix the dispensing portion 54 at a desired height from the base 52. In additional embodiments, smaller pedestal mounted rods having an adjustable height may be placed at higher locations, such as a counter top.

In further additional embodiments, locking telescoping rods may be suitable for applications requiring vertical floor to ceiling contact. For example, a shelving unit may include a vertical main telescoping tube affixed between upper and lower horizontal surfaces. The shelving unit may also include shelves extending laterally from the main telescoping tube at intermediate positions along the length.

Figure 3:
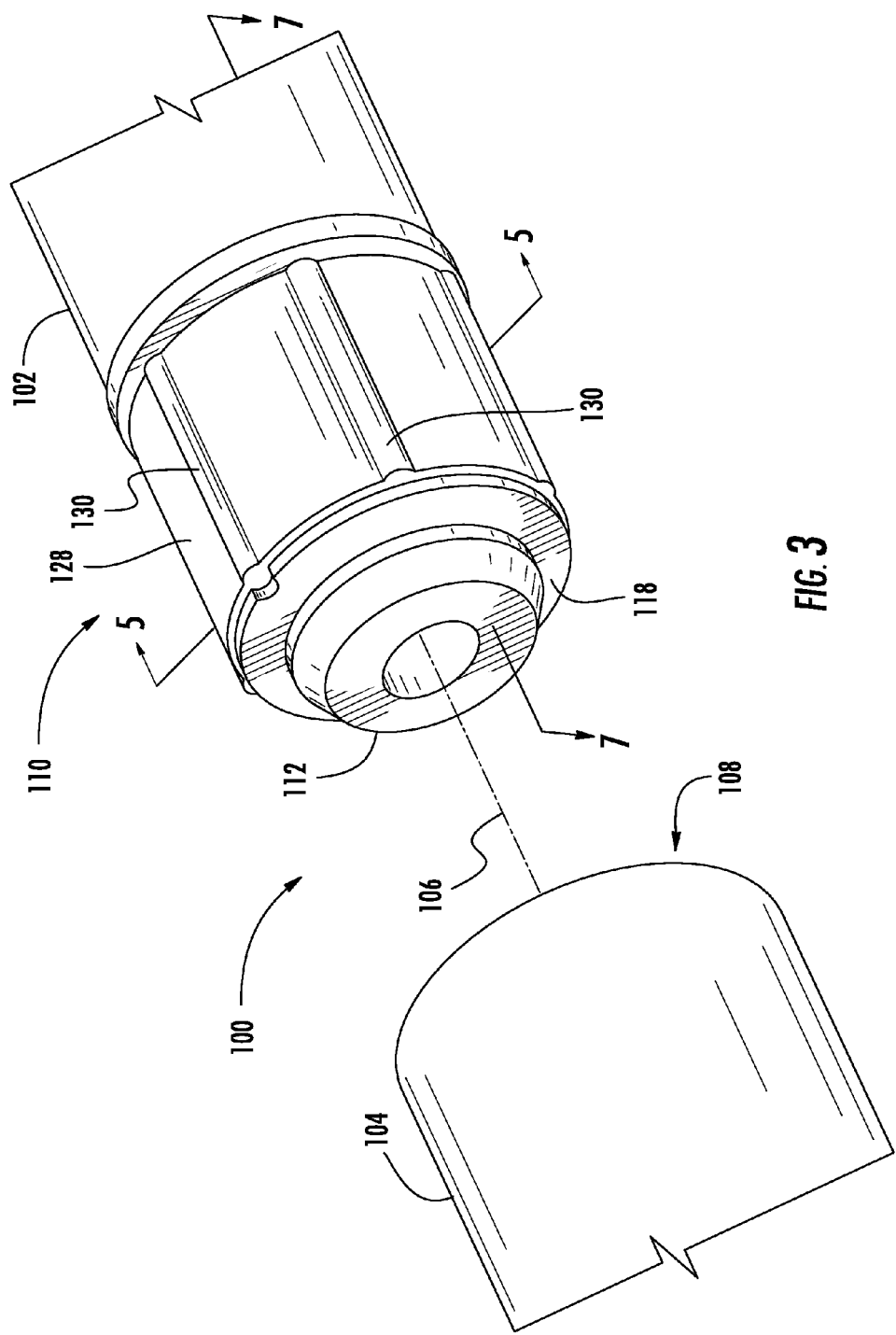
FIG. 3 is a perspective view of a locking telescoping rod.

FIG. 3 depicts a locking mechanism of a telescoping rod 100 capable of extending and retracting over a range of lengths as desired by a user. The telescoping rod 100 of FIG. 3 is shown separated, where a fixed first elongate tubular member 102 is detached from a movable second elongate tubular member 104. Each of the first tubular member 102 and the second tubular member 104 include a hollow inner cavity. The first tubular member 102 also defines a primary axis 106 in a longitudinal orientation with respect to the length of the tube. The second tubular member 104 defines a diameter of an internal cavity 108 that is greater than an outer diameter of the first tubular member 102. The second tubular member 104 is large enough to slide over the first tubular member 102 along the direction of the primary axis 106. When both tubular members are combined, an overall length of the rod 100 may be extended or collapsed by longitudinally translating the second tubular member 104 relative to the first tubular member 102.

The rod 100 is further provided with a cam locking mechanism 110 to selectively restrict axial movement of the second tubular member 104 relative to the first tubular member 102. The cam locking mechanism 110 includes a cam body 112 having shaft portion including a slot. The cam slot includes an oblong outer surface with a distance from the primary axis 106 that varies as a function of angular position around the cam body 112. In at least one embodiment, the cam body is provided with an oval shaped cross section through the shaft portion. The cam body 112 is inserted into an inner cavity 114 of the first tubular member 102. The cam body 112 may be affixed within the inner cavity 114 by a number of retaining methods. For example, the cam body 112 may be press fit, adhesively bonded, or staked with protrusions or formations of the first tubular member 102.

Figure 4:
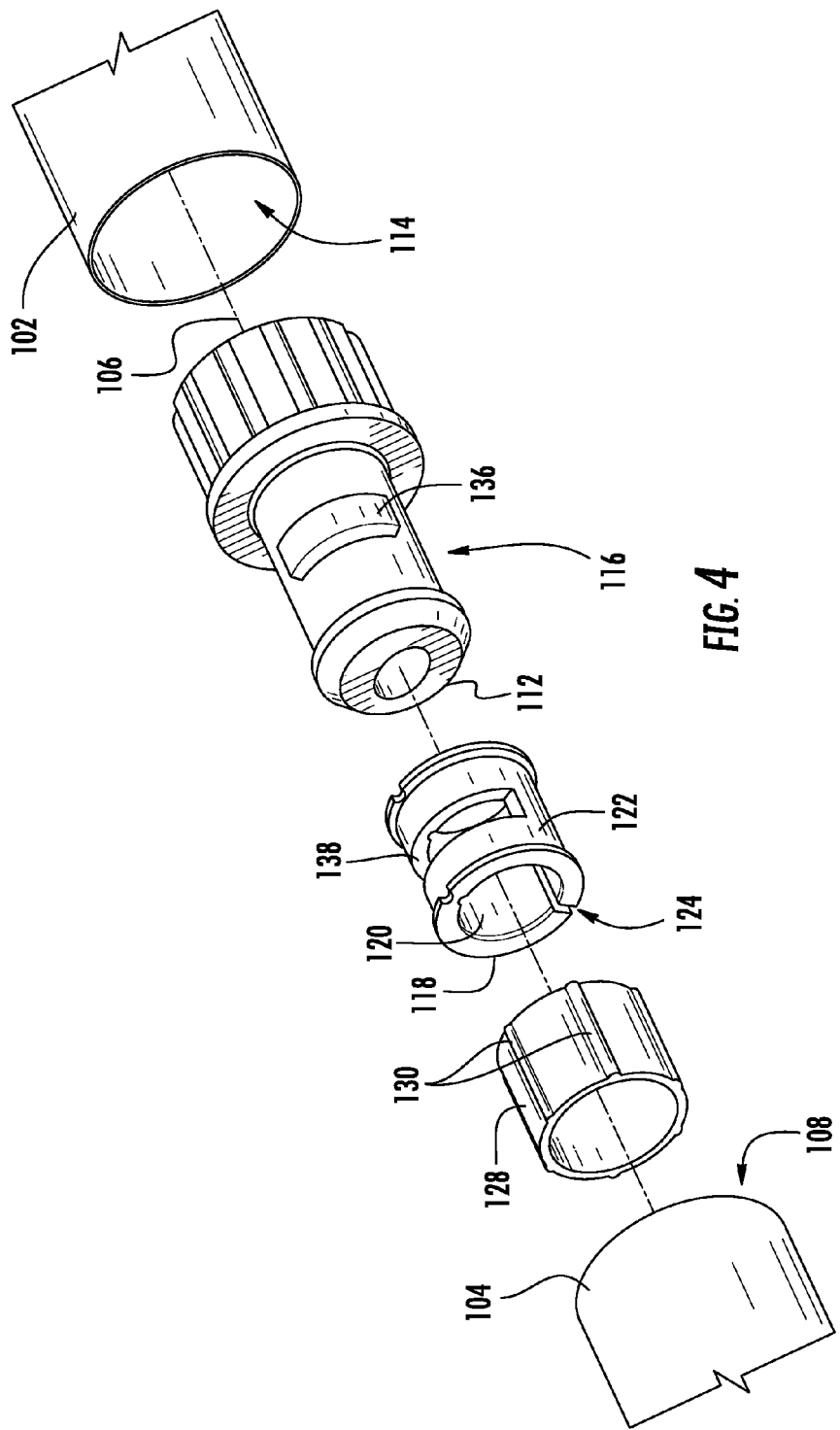
FIG. 4 is an exploded perspective view of the telescoping rod of FIG. 3.

FIG. 4 is an exploded perspective view showing components of the cam locking mechanism further separated. As discussed above, the cam body 112 is provided with a cam slot 116. A collar 118 is disposed about the cam body 112 and seats into the cam slot 116. The collar 118 includes an oblong shaped inner surface 120 that coincides with the shape of the shaft of the cam body 112 in a first unlocked position. The collar 118 also includes a generally circular outer surface 122 such that the collar is substantially cylindrical on an outer portion. In at least one embodiment, the collar 118 defines an open cross section having a gap 124. The open section shape is adapted to flex and expand in response to outward forces from the cam body 112. A hinge portion 126 may also be formed in the collar 118 at a location generally across from the gap 124. For example, the hinge portion 126 may be a notch on the inner surface 120 of the collar 118. Therefore the collar 118 flexes more easily about the hinge portion 126 without causing a stress riser or permanent deformation. The flexible nature of the collar 118 may further aid in the manufacturing of the locking mechanism 110 because the gap 124 may be elastically deflected far enough to assembly the collar 118 over the cam body 112 by a snap fit.

An elastomeric sleeve 128 is disposed about the circular outer surface 122 of the collar 118. The elastomeric sleeve 128 is provided with a closed section that encloses the gap 124 of the collar 118. The sleeve 128 is also flexible and adapted to stretch and expand along with the collar 118 in response to outward forces from the cam body 112. For example, the elastomeric sleeve may be formed from a thermoplastic polyurethane material. The elastomeric sleeve 128 further helps to retain the collar 118 within the cam slot 116 by wrapping the collar and limiting expansion of the gap 124.

Figure 5:
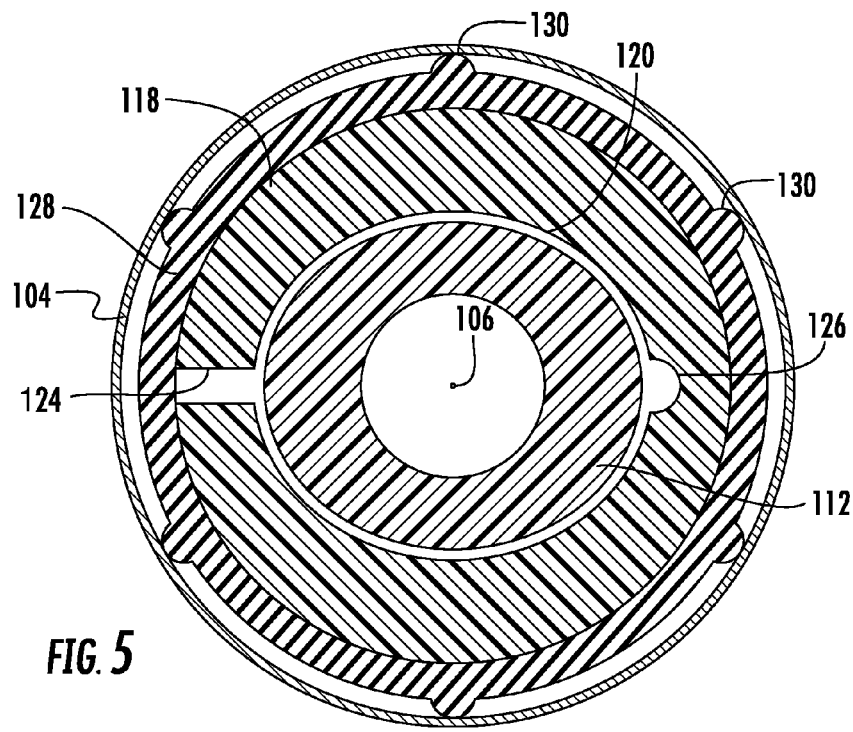
FIG. 5 is a cross-sectional view along line 5-5 of FIG. 3 of the telescoping rod in an unlocked position.
Figure 6:
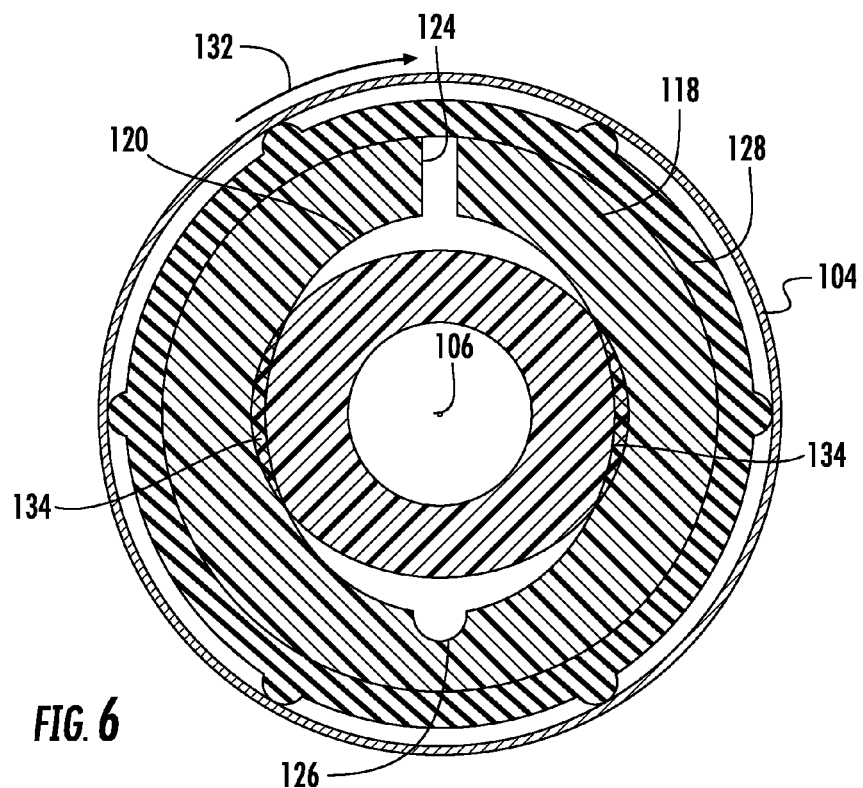
FIG. 6 is a cross-sectional view along line 5-5 of FIG. 3 of the telescoping rod in a locked position.
Figure 7:
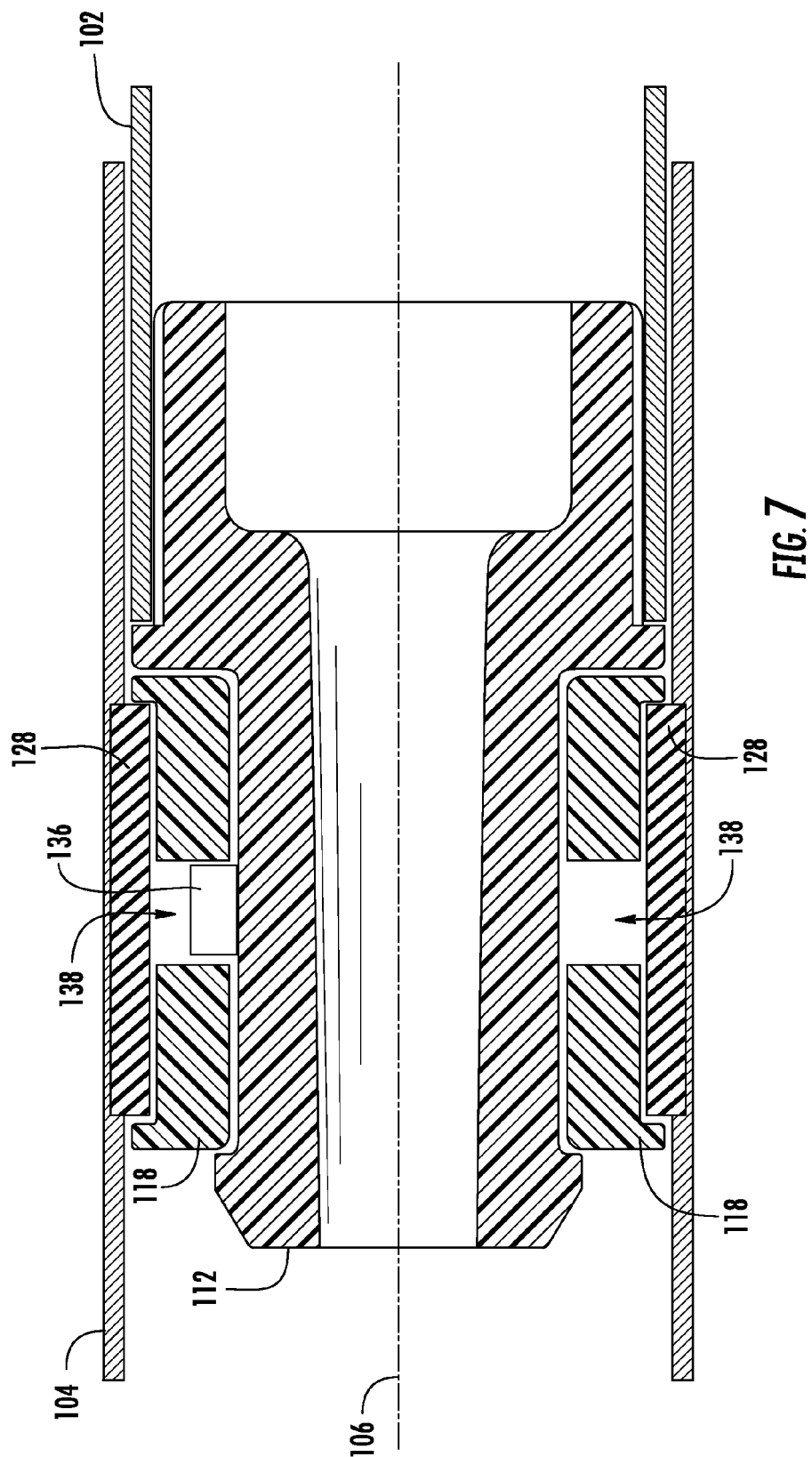
FIG. 7 is a cross-sectional view along line 7-7 of FIG. 3 of the telescoping rod in a locked position.

FIGS. 5 and 6 are cross sectional views along line 5-5 of FIG. 3. The cross sections are cut through the cam slot 116 of the cam body 112. One example shape of the oblong shaft portion of the cam body 112 may be seen in the sectional view. As discussed above, the distance from the center, or primary axis 106, to the outer surface of the cam body 112 varies as a function of angular position around the cam body 112.

FIG. 5 depicts the locking mechanism 100 in a first unlocked position. In the first position, the inner surface 120 of the collar 118 is oriented to coincide with the oblong shape of the cam body 112. The corresponding shapes of the collar 118 and the oblong surface of the cam body are aligned and nest relative to each other, and there is little outward pressure applied to the inner surface of the second tubular member 104. In this way, longitudinal translation of the second tubular member along the primary axis is allowed.

The elastomeric sleeve 128 is provided with a plurality of frictional outer formations 130 on an outer portion to maintain contact with the inner surface of the second tubular member 104 in both of the locked and unlocked positions. The outer formations 130 create a stable baseline amount of persistent contact between the second tubular member 104 and the elastomeric sleeve 128. The contact in turn creates a frictional resistance to limit relative slip between the second tubular member 104 and the elastomeric sleeve 128. In this way, rotation of the tubular member 104 forces concurrent rotation of the elastomeric sleeve 128 about the primary axis 106. Additionally, the coefficient of friction between the elastomeric sleeve 128 and the collar 118 causes the collar to rotate along with the second tubular member 104. Both of the collar 118 and the cam body 112 may be formed from a semi-rigid, low friction material such as nylon for example. Therefore, the coefficient of friction between the collar 118 and the cam body 112 is less than the coefficient of friction between the elastomeric sleeve 128 and the outer surface 122 of the collar 118. Also the plurality of formations 130 correspond to an increased friction level from the elastomeric sleeve 128 and the second tubular member 104. This helps to ensure that the elastomeric sleeve 128, as well as the collar 118, rotates along with the second tubular member 104 relative to the cam body 112. In further embodiments, different surface treatments are applied to the inner and outer surfaces of the collar to influence the relative sliding conditions at each interface. In additional further embodiments, the elastomeric sleeve may be adhered or otherwise affixed to the collar during manufacturing to further resist relative slip between the components.

FIG. 6 depicts the second tubular member rotated to a locked position. When the second tubular member 104 is rotated about the primary axis 106 relative to the cam body 112, the outer formations 130 induce friction and cause the elastomeric sleeve 128, as well as the collar 118, to rotate. In the cross sectional view of FIG. 6, the direction of rotation is clockwise and indicated by arrow 132. The inner surface 120 of the collar 118 is misaligned with respect to the oblong shape of the cam body 112 when in the locked position. The major and minor dimensions of the oblong shape of the inner surface 120 are rotated, and in response cause a material interference 134 between the collar 118 and the cam body 112. FIG. 6 shows the interference and reflects the collar 118 as undeflected. In practice, the interference 134 causes portions of the collar 118 to deform outwardly. The bulge or outward expansion created by the stacking of additional material creates an outward radial force from the collar 118, through the elastomeric sleeve 128, against the internal surface of the second tubular member 104. The resulting force in turn provides increased frictional resistance to prevent translation of the second tubular member 104 along the primary axis 106 relative to the cam body 112.

Although the cam body is depicted by way of example having an oval shape with two opposing lobes, it is contemplated that additional shapes may be suitable according to aspects of the present disclosure. For example, a tri-lobe cross section having three outward lobes extending from the shaft portion may also achieve similar force characteristics to the locking mechanism described above. Additional lobes may be included to cause more outward force locations against the inner surface of the second elongate tube.

Referring back to FIG. 4, the locking mechanism 100 may further include stop features to limit the rotation at opposing locked and unlocked positions. Outward protrusion 136 extends radially from the shaft portion of the cam body 112. A corresponding groove 138 is formed in the collar 118 to receive the protrusion 136. Both of the protrusion 136 and the groove 138 extend tangentially for differing lengths about the primary axis 106. The groove 138 includes an extended length such that the protrusion 136 may traverse the groove 138 during rotation. In at least one embodiment, the protrusion extends for a length corresponding to 90 degrees, and the groove extends for a length corresponding to 180 degrees. In this way, the difference in angular rotation between the locked position and the unlocked position is approximately 90 degrees. Angular rotation of the collar such that the protrusion 136 abuts a first end of the groove 138 defines the locked position. Correspondingly, counter-rotating the collar 118 such that the protrusion 136 abuts a second end of the groove 138 defines the unlocked position. This configuration inhibits an over-rotation of the second tubular member 104, elastomeric sleeve 128, and the collar 118. Restriction of movement at opposing ends of the range of rotation helps to create user error proofing, because a user is able to tactically feel the limits in each direction of rotation. Although a protrusion on the cam body is disclosed by way of example, it is contemplated that the configuration may be reversed such that a protrusion is disposed on the collar to engage a groove on the cam body.

Rotation from the unlocked position to the locked position causes generation of the outward forces discussed above. Conversely, a counter-rotation from the locked position to the unlocked position reduces the outward forces to substantially zero allowing easy relative adjustment between the tubular members. A user is thereby provided with a quick and ergonomically conducive way to engage and disengage the locking mechanism 110.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adjustable rod assembly comprising:
    an elongate first tubular member defining a primary axis, the first tubular member having a first end and a second end;
    a cam body secured to the first end of the first tubular member and having an oval shaft portion;
    a collar disposed about the cam body with an oval inner surface shaped to be concentric and nest with the oval shaft portion in an unlocked position;
    an elastomeric sleeve disposed about the collar; and
    an elongate second tubular member having a first end sized to receive the first end of the first tubular member within an internal cavity, wherein rotation of the first tubular member causes rotation of the cam body relative to the collar from the unlocked position to a locked position,
    wherein in the locked position, the cam body expands the collar and thereby causes an outward radial force from the elastomeric sleeve against an internal surface of the second tubular member to resist axial translation of the second tubular member relative to the first tubular member; and
    wherein the cam body has a protrusion extending from the oval shaft portion adjacent a minor dimension of the oval shaft portion to engage a groove included with the collar, the groove having a second angular length greater than a first angular length of the protrusion, wherein the protrusion moves within the groove as the first tubular member is rotated such that the protrusion abutting a first end of the groove defines the locked position, and the protrusion abutting a second end of the groove defines the unlocked position, wherein the groove limits rotation of the first tubular member to the locked position and thereby prevents over-rotation.

2. The adjustable rod assembly of claim 1 wherein an angular misalignment about the primary axis between the oval shaft portion and the oval inner surface of the collar causes the collar to expand creating a material interference to exert the outward radial force on the internal surface of the second tubular member.

3. The adjustable rod assembly of claim 1 wherein a rotation of the second tubular member relative to the cam body to the unlocked position reduces the outward radial force from the elastomeric sleeve to allow axial translation of the second tubular member relative to the first tubular member.

4. The adjustable rod assembly of claim 1 wherein a coefficient of friction between the elastomeric sleeve and the collar is greater than the coefficient of friction between the collar and the cam body.

5. The adjustable rod assembly of claim 1 wherein the collar includes a circular outer surface in contact with an inner surface of the elastomeric sleeve, the outer surface being substantially concentric to the oval shaft portion.

6. An adjustable rod assembly comprising:
    a first tubular member defining a primary axis;
    a cam body secured to a first end of the first tubular member, the cam body defining an oval outer surface along a shaft portion, wherein a protrusion protrudes radially outward from the shaft portion and extends a first angular distance adjacent a minor dimension of the oval outer surface;

a second tubular member having a first end sized to slide over the first tubular member and the cam body;

a collar disposed about the oval outer surface of the cam body, the collar having an oval inner surface shaped to be concentric and nest with the oval shaft portion in an unlocked position and the collar having a window receiving the protrusion and extending a second angular distance greater than the first angular distance of the protrusion; and an elastomeric sleeve disposed about the collar, wherein a rotation of the cam body about the primary axis relative to the collar causes the oval outer surface to generate an outward force by the elastomeric sleeve against an inner surface of the second tubular member, wherein the protrusion moves within the groove as the first tubular member is rotated, and wherein the groove limits rotation of the first tubular member and thereby prevents over-rotation.

7. The adjustable rod assembly of claim 6 wherein a coefficient of friction between the elastomeric sleeve and the collar is greater than the coefficient of friction between the collar and the cam body.

8. The adjustable rod assembly of claim 6 wherein the elastomeric sleeve includes a plurality of outer formations to maintain contact with the inner surface of the second tubular member.

9. The adjustable rod assembly of claim 6 wherein the collar defines an open section and is adapted to flex about a hinge portion in response to the outward force.

10. The adjustable rod assembly of claim 6 wherein the rotation of the first tubular member in a first direction causes the cam body to rotate until the protrusion abuts a first end of the groove that defines a locked position, and rotating the first tubular member in a second direction causes the cam body to rotate until the protrusion abuts a second end of the groove that defines the unlocked position.

11. The adjustable rod assembly of claim 10 wherein a difference between the first angular length of the protrusion and the second angular length of the groove defines a difference in angular rotation about the primary axis between the locked position and the unlocked position being about 90 degrees.

12. The adjustable rod assembly of claim 6 wherein a counter-rotation of the second tubular member relative to the cam body reduces the outward force from the collar to allow axial translation of the second tubular member relative to the first tubular member.

13. An adjustable rod assembly comprising:

an elongate first tubular member;

an elongate second tubular member adapted to longitudinally translate over the first tubular member to adjust an overall length of the adjustable rod assembly;

a cam body affixed to an end of the first tubular member, the cam body includes a shaft portion defining an oval surface, wherein a protrusion protrudes radially outward from the shaft portion along a minor dimension of the oval surface and extends a first angular length;

a collar defining an oval inner surface shaped to be concentric and nest with the oval surface in an unlocked position, and an outer surface defining a cylindrical shape, the collar having a groove forming a window between the inner surface and the outer surface of the collar, the window receiving the protrusion and extending a second angular length greater than the first angular length of the protrusion; and an elastomeric sleeve having a closed section and disposed about the collar, wherein rotation of the first tubular member causes rotation of the cam body relative to the collar and the protrusion moves within the groove to a locked position, wherein in the locked position, the collar is adapted to expand and the elastomeric sleeve is adapted to deform and generate an outward radial force upon an inner surface of the second tubular member thereby restricting longitudinal translation of the second tubular member relative to the first tubular member thereby fixing the overall length of the rod assembly, wherein the groove limits rotation of the first tubular member to the locked position and thereby prevents over-rotation.

14. The adjustable rod assembly of claim 13 wherein a coefficient of friction between the elastomeric sleeve and the collar is greater than the coefficient of friction between the collar and the cam body.

15. The adjustable rod assembly of claim 13 wherein the collar defines an open section having a hinge portion and the collar flexes about the hinge portion in response to the outward radial force.

16. The adjustable rod assembly of claim 13 wherein the elastomeric sleeve includes at least one formation disposed on an outer portion to maintain contact with the inner surface of the second elongate tubular member.

17. The adjustable rod assembly of claim 16 wherein rotation of the second elongate tubular member frictionally engages the at least one formation and causes a concurrent rotation of the elastomeric sleeve.

18. The adjustable rod assembly of claim 13 wherein rotating the collar such that the protrusion abuts a first end of the groove defines the locked position, and rotating the collar such that the protrusion abuts a second end of the groove defines the unlocked position.

19. The adjustable rod assembly of claim 18 wherein a difference between the first angular length of the protrusion and the second angular length of the groove defines a difference in angular rotation about the primary axis between the locked position and the unlocked position being about 90 degrees.

* * * * *